United States Patent [19]

Schenk

[11] Patent Number: 5,139,118
[45] Date of Patent: Aug. 18, 1992

[54] APPARATUS AND METHOD OF PHASE CHANGE DISC BRAKE

[75] Inventor: Donald E. Schenk, Vandalia, Ohio

[73] Assignee: General Motors Corporation, Detroit, Mich.

[21] Appl. No.: 630,980

[22] Filed: Dec. 20, 1990

Related U.S. Application Data

[63] Continuation-in-part of Ser. No. 353,127, May 17, 1989, abandoned.

[51] Int. Cl.⁵ .................................... F16D 65/853
[52] U.S. Cl. .......................... 188/264 CC; 188/71.6; 188/218 A
[58] Field of Search ............ 188/264 CC, 218 A, 71.6

[56] References Cited

U.S. PATENT DOCUMENTS

| | | | |
|---|---|---|---|
| 1,977,012 | 10/1934 | Reinhold | 252/73 X |
| 2,265,340 | 12/1941 | Bond | 188/218 A |
| 2,407,197 | 9/1946 | Watts | 188/264 CC |
| 2,867,296 | 1/1959 | Requenes | 188/264 CC X |
| 2,966,241 | 12/1960 | Martin | 188/264 CC |
| 3,208,559 | 9/1965 | Chambers et al. | 188/264 CC |
| 3,592,298 | 7/1971 | Leffert et al. | 188/264 CC X |
| 3,651,895 | 3/1972 | Whilfield | 188/264 CC X |
| 5,009,291 | 4/1991 | Castellano | 188/264 CC X |

FOREIGN PATENT DOCUMENTS

| | | | |
|---|---|---|---|
| 701725 | 12/1953 | United Kingdom | 188/264 CC |
| 1096633 | 12/1967 | United Kingdom | 188/264 CC |
| 1413520 | 11/1975 | United Kingdom | 188/264 CC |
| 2088503 | 6/1982 | United Kingdom | 188/264 CC |

Primary Examiner—George E. A. Halvosa
Attorney, Agent, or Firm—Ernest E. Helms

[57] ABSTRACT

A vehicle brake caliper with a piston having a cavity is provided. A phase change material is inserted within the piston cavity wherein an increase in heat energy into the piston due to an application of the brake piston causes the brake piston temperature to increase and then to stabilize by heat energy absorption by the phase change material during its change of state.

1 Claim, 2 Drawing Sheets

APPARATUS AND METHOD OF PHASE CHANGE DISC BRAKE

FIELD OF THE PRESENT INVENTION

This Application is a Continuation In Part of U.S. patent application Schenk Ser. No. 07/353,127, filed May 17,1989, now abandoned.

The field of the present invention is that of calipers and rotors for automotive disc type vehicle wheel brakes. It is known in the art to provide disc type brakes. A more detailed description of vehicle disc type brakes can be found from a reading of U.S. Pat. Nos. 4,603,760; 4,596,317; 4,509,619; 4,487,297; 4,475,634; 4,470,485; and 4,433,757, commonly assigned in the disclosures thereof are incorporated by reference herein.

As apparent to those skilled in the art, one of the major problems inherent in automotive braking and indeed the motivating factor towards the development of disc type brakes is that of heat buildup. Excessive heat buildup during prolonged intense utilization (or abuse) can cause heat buildup within the disc brake to the point approximating the boiling point of the brake fluid given rise to a potential of vapor lock within the brake hydraulic system.

The present invention provides a disc brake caliper and rotor which more resistant to a temperature rise as a result of heat buildup than the disc brake calipers and rotors aforementioned.

SUMMARY OF THE INVENTION

It is an object of the present invention to provide an improved disc brake caliper and rotor apparatus and method of utilization thereof which stabilizes its temperature during heat buildup in a manner superior to that of the brakes disclosed in the aforementioned patents. The above characteristics are achieved by the utilization of a phase change material within the rotor or caliper which effectively stabilizes the temperature during an influx of heat into the vehicle wheel brake.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
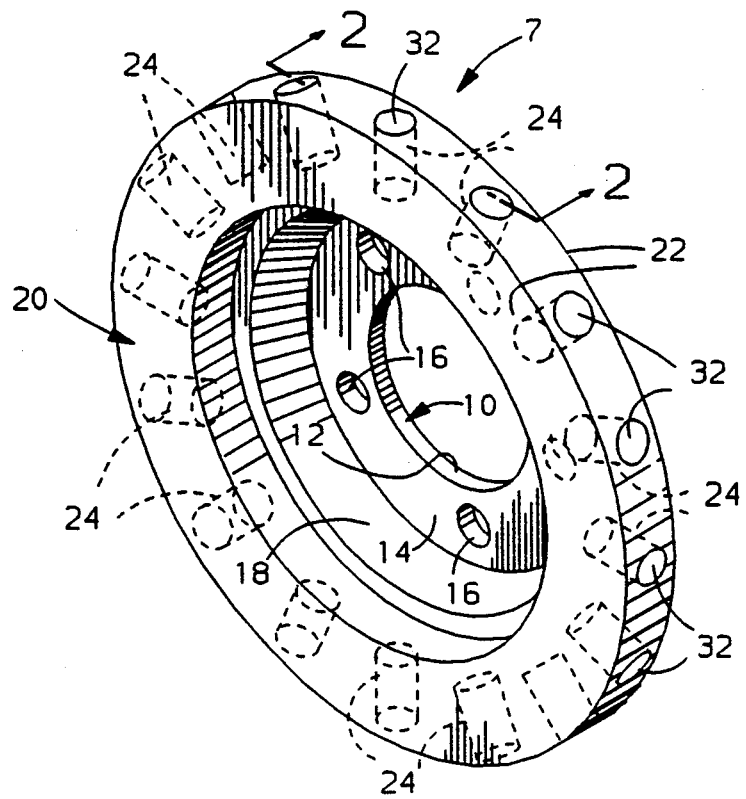
FIG. 1 is a perspective view of a preferred embodiment disc brake rotor according to the present invention.
Figure 2:
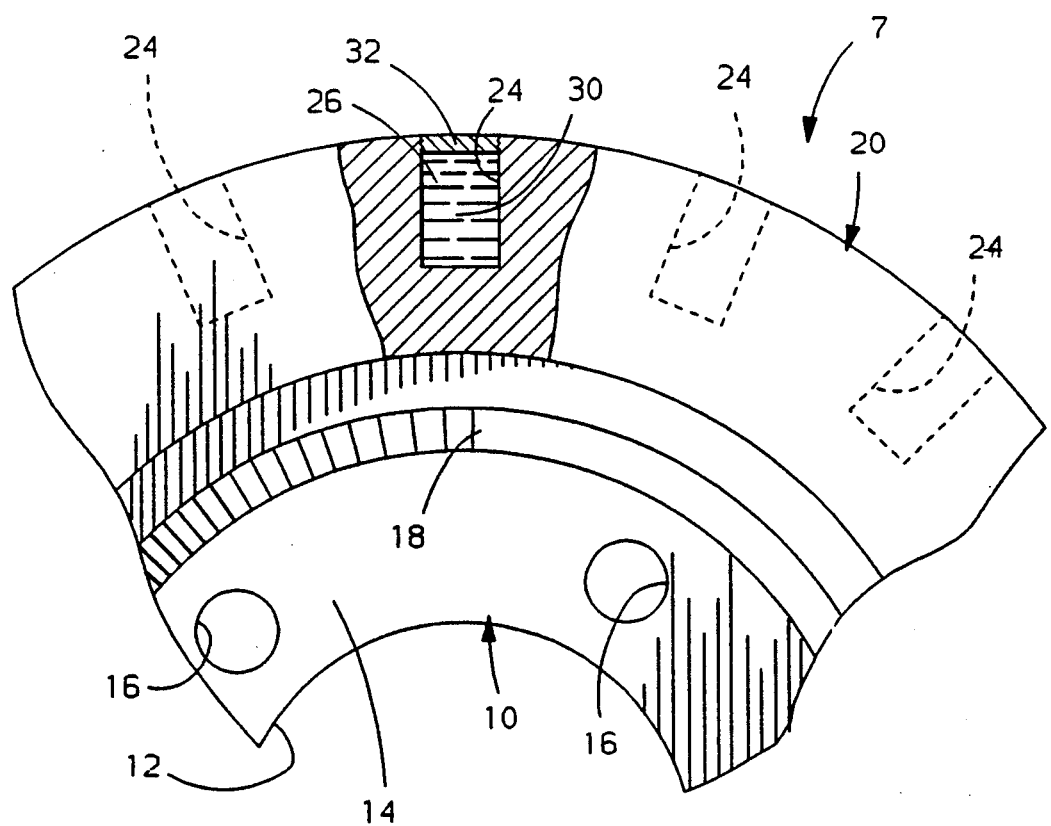
FIG. 2 is a view taken along line 2—2 of FIG. 1.

Referring to FIGS. 1 and 2, a disc brake rotor 7 for a vehicle wheel brake according to the present invention is provided. The disc brake rotor 7 has a core section 10 with an inner central aperture 12 for passage of the wheel hub (not shown). Surrounding the central aperture 12, the core section 10 has a plurality of geometrically spaced apertures 16 for alignment with the stubs of the vehicle wheel (not shown) to allow the rotor to be attached thereto by nuts. Joined to the flat portion 14 of the core is an inclined ring portion 18 of the core 10 which is integral with the flat portion 14.

Joined to the inclined ring portion of the core section is an annular ring 20. The annular ring 20 is generally flat and provides a flat annular surface 22 for frictional engagement with a piston (via the shoe pad) and for an outboard shoe. The rotor 7 illustrated in FIG. 1 is of a single annular ring design, however, the rotor can be of a double ring design, as shown in the rotor illustrated in FIG. 4, wherein the rings are joined by generally radial projecting fins.

Figure 3:
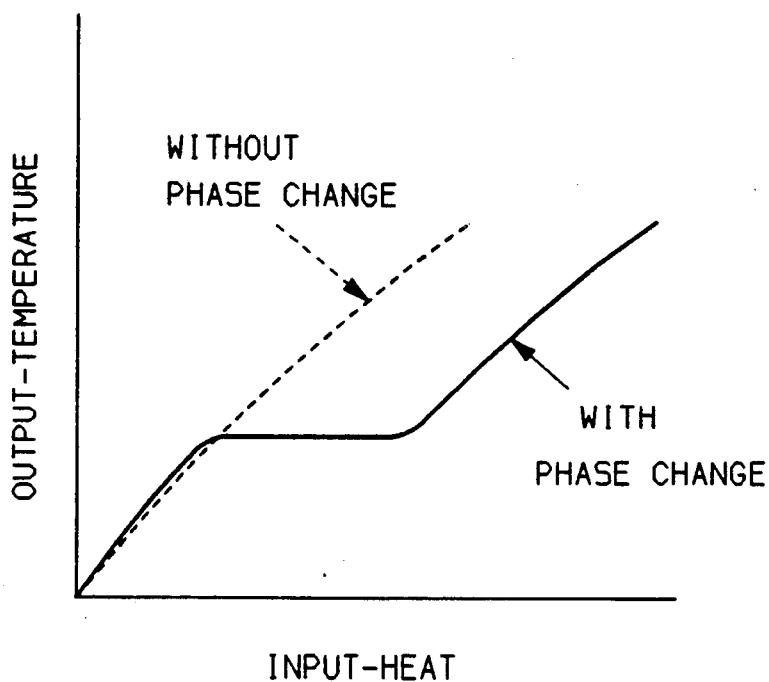
FIG. 3 is a graph illustrating the relationship between heat input and output temperature in a brake component according to the present invention.

Inserted within the geometrically spaced cavities 24 of the rotor, 7 is a phase change material 26. The phase change material 26 may be a liquid mixture such as that of a water/alcohol mixture, which during operation will change into a vapor phase, or it may be, during normal conditions, a solid which changes into a liquid, as as a paraffin wax 30. The wax 30 is held within the rotor cavity 24 by a sealing member 32 which is threaded to the annular ring or an alternative embodiment, it can be welded therein. Additionally, in an embodiment, not shown, the phase change material can be encapsulated in ceramic modules using a bubbling technique. These ceramic modules may be placed in the mold for the casting of the rotor, thereby providing a cavity with the phase change material encapsulated therein without a necessity of a drilling and then a another operation to insert a non homogeneous sealing member. Preferably, whatever material will be utilized in the phase change, it should have a change of physical state at a temperature below that of the boiling point of the hydraulic fluid used to pressurize the caliper. FIG. 3 illustrates the stabilizing effect of the phase change material. As heat is input, temperature will typically rise until the point that the physical state change occurs in the phase change material. At this point temperature will typically stabilize unless the heat input greatly increases, therefore, for a given input heat the output temperature has been reduced.

Figure 4:
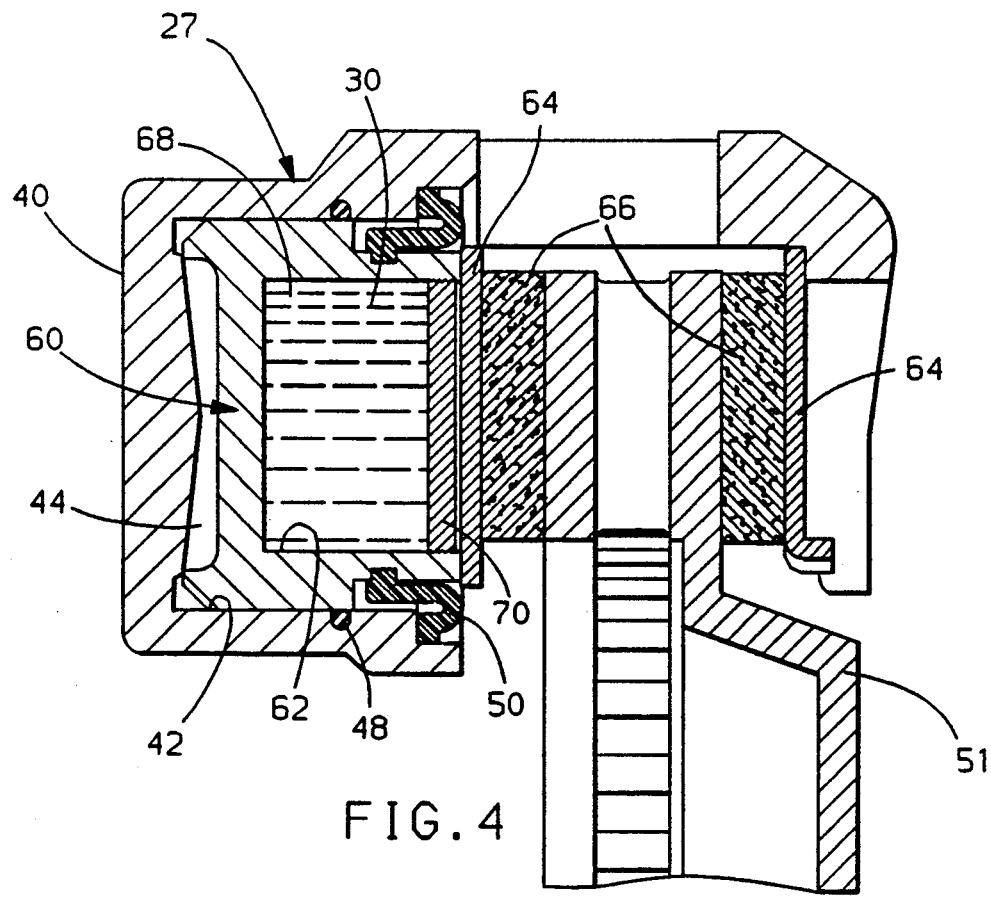
FIG. 4 is a sectional view of a preferred embodiment disc brake caliper according to the present invention.

FIG. 4 illustrates a preferred embodiment brake caliper 27 according to the present invention. The brake caliper has a frame 40 for connection with the vehicle (not shown). The frame 40 has a longitudinal bore 42 for receipt of pressurized brake fluid through an inlet (not shown) to an area 44. The basic frame 40 of the caliper can be of one of several configurations, and as shown is a C type caliper allowing application of braking force on both sides of a rotor 51. The caliper 27 is slidably mounted transversed to the rotor 51 with respect to the frame of the vehicle in a conventional manner as described in one of the previously commonly assigned patents. A piston 60 having a cavity 62 is slidably mounted within the caliper longitudinal bore 42. A seal ring 48 provides the means for sealing the piston 60 within the longitudinal bore 42. The seal ring 48 is protected from dust and other foreign particles by a surrounding boot 50. Connected with the piston is a brake pad backing plate which mounts a brake pad 66, in direct contact with the cylindrical main body portion of the caliper piston 60. The brake pad 66 makes the frictional engagement with the rotor. During the application of braking, heat is generated by the frictional engagement of the pads 66 with the rotor 51. The heat is transferred to the caliper 27 and especially to the caliper piston 60. The caliper piston has a phase change material 68, preferably paraffin, which has a melting point below the boiling point of the brake fluid in space 44.

The paraffin is held within the piston by a sealing plate 70 which is threaded into the caliper piston and is spaced from the backing plate 64. The direct contact of the piston cylindrical body with the brake pad backing plate 64 allows the main cylindrical body of the piston 60 to act as a heat sink to withdraw heat from the backing plate 64 and therefore the piston 60 not only detours a temperature rise in the braking fluid but also acts as a heat sink for the brake pad backing plate 64 and pad material 66. Reduction of heat build up in the backing plate 64 will aid efforts to reduce brake squeal and lining wear.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A pressurized brake fluid activated disc brake caliper for an automotive vehicle brake having a rotor connected with a vehicle wheel, said caliper in combination comprising:

a frame means for connection with said vehicle, said frame having a longitudinal bore for receipt of pressurized brake fluid;

a piston slidably mounted in said longitudinal bore for movement toward said disc, said piston having a cylindrical main body with an end portion having a surface engaged by said fluid and an interior cavity opening from said end portion towards said rotor;

means to seal said piston in said frame longitudinal bore;

means to seal said piston cavity;

a brake pad connected with said piston for frictional engagement with said rotor, said brake pad having a backing plate in direct contact with said piston cylindrical main body and said brake pad being spaced from said means to seal said piston cavity; and a solid phase change material within and substantially completely filling said piston cavity between said end portion and said means to seal said piston cavity wherein an increase in heat energy in said piston due to an application of said brake pad against said rotor causes said piston temperature to increase and then to stabilize by heat energy absorption by said phase change material changing its physical state to a liquid at a temperature lower than the boiling point of the brake fluid.

* * * * *